Oct. 3, 1967  P. A. KIRSTEN  3,344,828
WOOD CUTTING MACHINE, PARTICULARLY EXCELSIOR MACHINE
Filed July 15, 1965  3 Sheets-Sheet 1
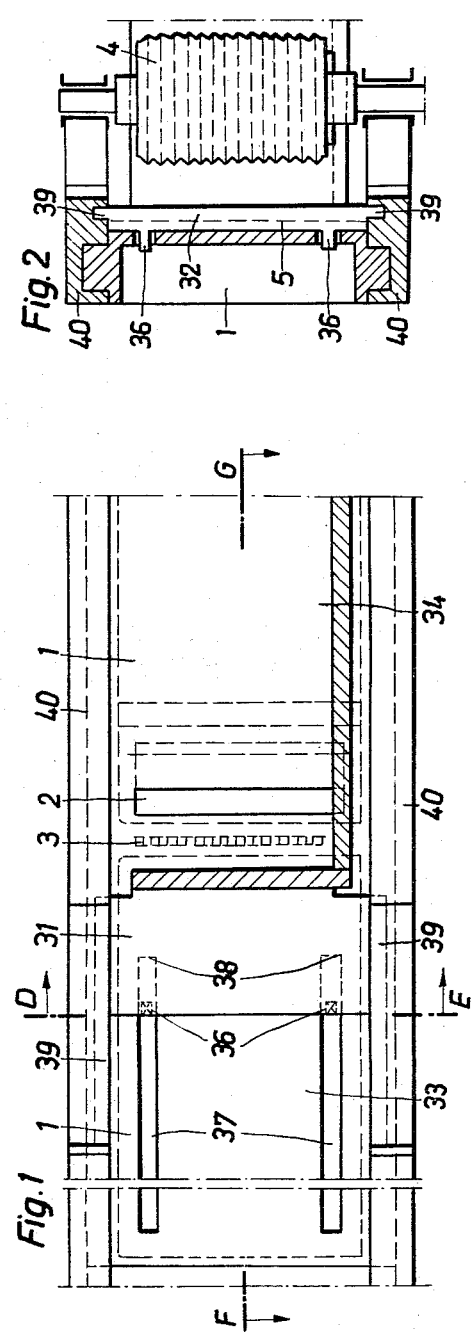
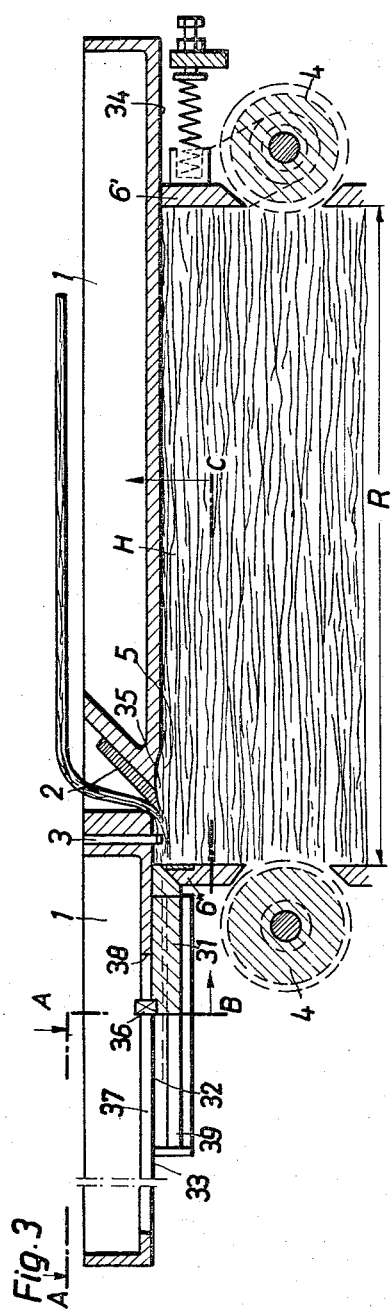
Inventor:
Paul Arthur Kirsten

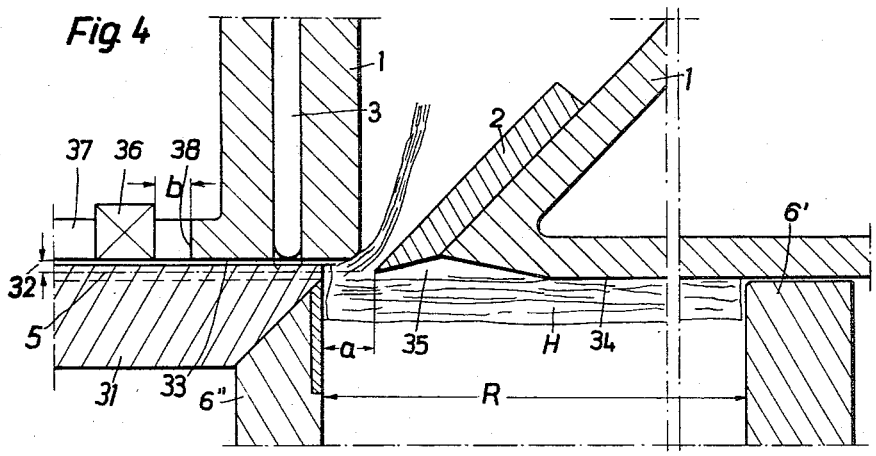
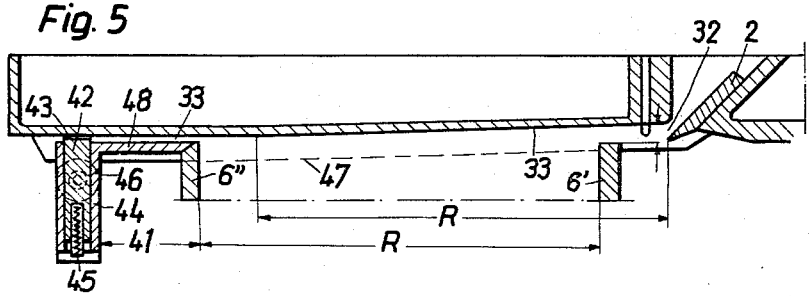
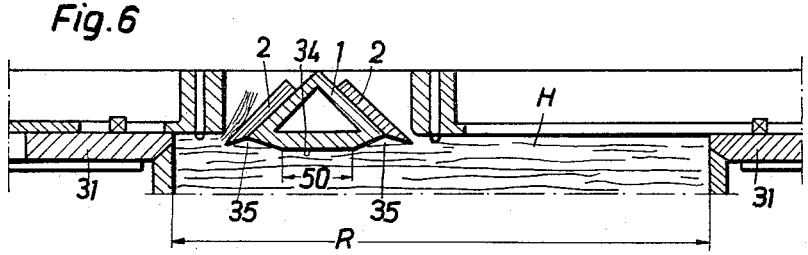

United States Patent Office 3,344,828
Patented Oct. 3, 1967

3,344,828
WOOD CUTTING MACHINE, PARTICULARLY EXCELSIOR MACHINE
Paul Arthur Kirsten, Ernst-Moritz-Arndt-Strasse 6, Beuel, near Bonn, Germany
Filed July 15, 1965, Ser. No. 472,278
7 Claims. (Cl. 144—180)

The invention relates to a wood cutting machine, and more particularly to an excelsior machine where a section of lumber of suitable length, such as a log, is fed in a direction transversely of its length by conveyor means to a knife carriage mounted for reciprocatory movement in the longitudinal direction of the lumber section.

In one known excelsior machine rotatable knurled feed rollers are employed and are arranged to engage the opposite ends of the log section and which rollers by their rotation feed the log to the knife carriage. Such knurled feed rollers by engaging the opposite ends of a log section hold the log section firmly during cutting, so that shavings of any desired thickness and quality are produced. However, it is impossible in known arrangements to cut the log section up completely. A residual piece of the log section of a thickness approximately equal to half the diameter of the feed rollers remains. This condition complicates the automatic continuous feeding of lumber.

In other cutting machines drive chains are used, having claws engaging the longitudinal sides of the logs for feeding them to be cut. The disadvantage of such drive chains is that the log section is not held sufficiently firm, particularly during cutting. Thus as a result cut wood particles are produced which in shape, dimensions and surface conditions do not correspond with desired dimensions and characteristics.

The foregoing disadvantages are eliminated in wood cutting machines provided with knurled feed rollers engaging opposite ends of a log section by incorporating plates between the feed rollers and the knife cutting plane which enable cutting of the logs as far as the knife cutting plane as disclosed by way of example in German Patent No. 1,156,549. However, in excelsior machines with a knife carriage mounted for back and forth movement in the longitudinal direction of the log section, difficulties are occasioned because the guide plates at the ends of a log section can extend only as far as the knife cutting plane. In the foregoing arrangement a gap exists between the upper edge of the guide plates and the knife carriage surface, in that the knife path must extend on both sides beyond the guide plates. The size of this gap is a function of the protrusion of the knife edge beyond the knife carriage surface. In the cutting of a log section there is an end residual portion which is equal to or smaller than the thickness of the shaving being effected. This residual end portion is engaged by the knife edge during the forward motion and is pushed below an anterior guide plate for the machine. During the reverse motion of the knife carriage such residual end pieces also may be carried along by the exposed area of the knife, and may readily jam between the posterior guide plate and the exposed knife area.

In order to eliminate these difficulties the present invention proposes the positioning of a locking plate for the gap between the portion of the knife carriage surface located ahead of the knife and the aforementioned known guide plate outwardly of the terminal end of the cutting area, and to provide the knife carriage surface of the knife carriage located behind the knife in cutting direction in a plane lying in or slightly above the knife cutting plane.

In the aforementioned construction during the forward motion of the knife thin residual end portions of a cut of a log section engages the locking plate and is deflected like the shavings previously peeled from the log by a slot placed ahead of the knife. In that the knife in its cutting stroke extends beyond the cutting area the locking plate may be moved along with the knife carriage, or the locking plate may be fixedly positioned slightly ahead of the reversing point of the knife in the return movement of the knife carriage.

In the construction of the present invention in the reverse movement of the knife and knife carriage no residual end portion of a log section can be ejected below and thru the posterior guide plate or jam between it and the knife, in that the gap below this guide plate is closed by the raised posterior knife carriage surface and is exposed only for a brief time for the passage of the knife. In order to avoid curtailing the clearance behind the knife edge required for the cut by the raised carriage surface, the exposed knife area is formed as part of a depression in the carriage surface at the knife. The raised carriage surface retains thin residual parts in the cutting area, and prior to the subsequent forward motion of the knife they are placed ahead of the knife by the total thrust of the log and deflected by the slot ahead of the knife.

Now in order to acquaint those skilled in the art with the manner of constructing and utilizing machines in accordance with my invention, I shall describe certain preferred embodiments of my invention in connection with the accompanying drawings.

The drawings represent certain preferred embodiments of the invention.

FIGURE 1 is a view partly in side elevation and partly in section with the view being taken along the line A–B–C of FIGURE 3;

FIGURE 2 is a detail sectional view taken along the line D–E of FIGURE 1;

FIGURE 3 is a view partly in plan and partly in section taken along the line F–G of FIGURE 1;

FIGURE 4 shows an enlarged detail sectional view of a portion of FIGURE 3;

FIGURE 5 is a view along the lines of FIGURE 3 and showing a modified form of locking plate of the invention;

FIGURE 6 is a view along the line of FIGURE 3 showing a double knife construction for use in the present invention.

Figure 7:
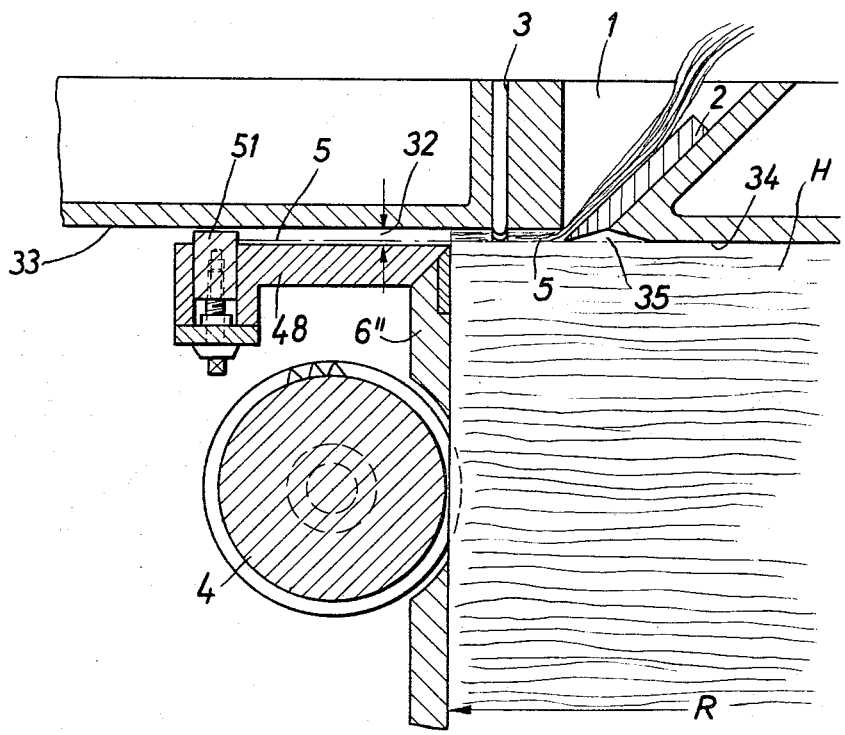
FIGURE 7 shows an enlarged detail view along the lines of FIGURE 3 with another modification of locking plate of the invention.

The knife carriage, indicated generally at 1 is equipped with known cutting knives 2 and slitting knives 3. End plates 6', 6" are arranged between the feed rollers 4 mounted for rotation to engage opposite ends of a log section for advancing the section in a direction transverse to its length to the knife cutting plane 5. End plate 6' as shown in spring biased into engagement with the adjacent end of log H and toward end plate 6" to provide a pressure-locking guidance of log H extending as far as the knife cutting plane. A locking plate 31, according to the invention, is provided for the gap 32 between the knife cutting plane 5 and the forward surface portion 33 of the carriage located forwardly beyond the cutting area R and ahead of the knife 2. The posterior surface portion 34 of the carriage is located in the plane of the knife cutting plane 5 or slightly thereabove, in order to maintain the cutting edge of the knife 2 free from wood H during its return movement or reverse run. Also, the foregoing relationship between the carriage surface 34 and the guide plate 6' eliminates any substantial gap therebetween, so that excelsior fibers or correspondingly thin wood fragments peeled off can no longer be pushed outwardly. If a short wood fragment should become lodged in the depression or relief 35 for knife 2 in the carriage surface 34, it would be of no consequence.

The locking plate 31 as best seen in FIGURES 1 and 3 is provided with cams 36 which engage in slots 37 of the knife carriage 1. If, as shown in FIGURE 4, the knife 2 has reached during its forward motion the distance —a— from the inside of the guide plate 6″, the terminal surfaces 38 of the slots 37 are at a distance of —b—<—a— from the cams 36 of the locking plate 31, so that the locking plate moves conjointly with the knife carriage 1 so that the cutting edge of the knife 2 will not engage the locking plate 31. The knife carriage 1 is provided with suitable guides 39 for guiding the movement of the locking plate 31 in the frame 40 of the machine. To avoid movement of the locking plate 31 by a wood remnant positioned ahead of the knife, screens may be provided. Such screens may be located, for example, between the locking plate 31 and the frame 40 of the machine. During the return or reverse run of the knife carriage 1 the locking plate 31 is returned by said carriage into its original position.

Shock-absorbing mechanical, electro-magnetic, pneumatic or hydraulic auxiliary means may be used for the movement of the locking plate instead of having the locking plate 31 carried along by the knife carriage 1.

In accordance with the present invention a stationary locking plate 51 shown in FIGURE 7 may be substituted for locking plate 31. As shown in FIGURE 7 the locking plate 51 is arranged at a distance from the cutting area R, which is somewhat greater than the extended run of knife 1 beyond the cutting area R, in order to avoid engagement of the cutting edge of knife 1 with the stationary locking plate 51 at the point of reversal of the knife carriage. A cover plate 48 is preferably provided between the guide plate 6″ and the stationary locking plate parallel to the carriage surface 33, and at least at a distance equal to the width of gap 32, so that wood remnants are prevented from escaping there.

FIGURE 5 shows another embodiment of the invention. In the illustrated position of the knife carriage a gap 32 exists between the knife carriage surface 33 ahead of knife 2 and extending as far as the guide plate 6″. The carriage surface 33 rises the distance of the gap approximately to the length R of the cutting area, so that in the illustrated position between carriage surface 33 and guide plate 6″ no substantial open gap exists. With the progressing forward motion of knife 2, however, a steadily increasing gap is created between guide plate 6″ and carriage surface 33, the width of which reaches in the position of the knife in the range of the guide plate 6″ the distance 32. A locking plate 42 movable approximately perpendicularly to the direction of motion of the knife carriage is arranged at a distance 41, which is slightly larger than the extended path of knife 2 beyond the cutting area R. The front surface 43 of plate 42 extends as far as the carriage surface 33 and it is moved by it perpendicularly to the knife cutting plane by the width of gap 32. The locking plate 42 slides in guides 44 at the frame 40 of the machine. Springs 45 press rollers 46 at the locking plate 42 against guide tracks 47 of the carriage surface 33, so that the front surface 43 always remains close to the carriage surface 33.

Thin wood residues locates ahead of knife 2 which no longer catch a hold at the guide plate 6″ are trapped by the locking plate 42 and deflected by the slot ahead of knife 2. It is expedient to provide, here too, as described in case of the stationary locking plate of the preceding paragraph, a cover plate 48 between the locking plate 42 and the guide plate 6″.

In this arrangement the feed of the wood section H is intermittent in the area of the guide plate 6′, as in excelsior machines of prior art, but during the cutting the feed between guide plates 6′ and 6″ is continuous. Thus, the increase of the carriage surface 33 by the gap width 32 does not disadvantageously effect the parallelism of the cut.

FIGURE 6 shows the application of the present invention in an excelsior machine wherein the knife carriage 1 embodies two knives 2 mounted in the manner known in prior art installed with outwardly oriented cutting edges. In this embodiment of the invention the knife surface 34 supporting the log H is of small length as shown at 50, and a depression 35 is located behind each knife 2, formed by the exposed surface of knife 2 and the transition area from it to the carriage surface 34. Movable locking plates 31 according to FIGURE 3 are shown embodied in FIGURE 6. However, if desired the stationary locking plates of FIGURE 7 may be used as well as the movable locking plates of FIGURE 5.

The knife carriages, if desired, may be provided with a pair of pivotally mounted knives in a manner known in the art.

In general in known excelsior machines the knives are set ahead by a constant value $x$ beyond the knife carriage surface. The parts of the carriage surface located in front and behind the knife are located in a plane and the desired thickness of the shaving is adjusted merely by the variation of the feed. According to the present invention the knife carriage surface 33 located ahead of knife 2 is used to limit the thickness of the shaving 3, and the knife carriage surface 34 located behind the knife is used to support the log and to close the aforementioned gap. In order to change the thickness of the shaving the distance of one surface must be modified with respect to the other. This can be done, for example, by having the knife carriage surface 33 ahead of the knife formed by a plate which is screwed with exchangeable spacer washers to the knife carriage 1, or plates of different thicknesses may be used. The feed then is adjusted according to the thickness of the shaving as in excelsior machines of prior art.

To facilitate sliding of the knife carriage surface over the log water may be applied to thereby serve as a lubricant. It is advantageous to do so from the interior of the knife carriage by providing small perforations therein.

What is claimed is:

1. In a machine of the class described embodying conveyor means for feeding an elongated wood section transversely of its length with respect to a knife carriage mounted forward and rearward reciprocatory movement in the lengthwise direction of said wood section, and having forward and rearward plate means for engaging the forward and rearward ends of said wood section to hold the latter in position for cutting, the combination of knife means mounted in said carirage means for cutting said wood section in the forward movement of said carriage means, said carriage means having a first carriage surface lying ahead of said knife and a second carriage surface lying rearwardly of said knife, said forward plate means and said knife defining a gap therebetween in the forward movement of said knife toward said forward plate means at the forward terminal end portion of said wood section, locking plate means mounted outwardly of said forward plate means providing for cutting of said wood section at said gap by said knife, said second carriage surface lying in a plane not extending below the plane of said first carriage surface, and a relief depression between said knife and said second carriage surface.

2. The machine of claim 1 characterized by the provision of means between said locking plate means and said carriage means for effecting movement of said locking plate means by movement of said carriage means at said gap.

3. The machine of claim 1 characterized by said locking plate means being stationarily mounted and spaced from said forward plate means a distance at least as great as the width of said gap.

4. The machine of claim 1 characterized by said locking plate means including means for mounting the same for movement transverse to the direction of movement of said carriage means and upon change of movement of said carriage means from its forward end position toward its rearward position, and in which said first carriage surface being formed so as to extend away said wood section in movement of said knife across said gap.

5. The machine of claim 5 characterized by cover plate means between said locking plate means and said forward plate means.

6. The machine of claim 1 characterized by said locking plate means being movable relative to said carriage means, and cover plate means between said locking plate and said forward plate means.

7. In a machine of the class described embodying conveyor means for feeding an elongated wood section transversely of its length with respect to a knife carriage mounted for forward and rearward reciprocatory movement in the lengthwise direction of said wood section, and having forward and rearward plate means for engaging the forward and rearward ends of said wood section to hold the latter in position for cutting, the combination of a pair of knife means mounted in said carriage means for cutting said wood section in the reciprocatory movement of said carriage means, said carriage means having first carriage surface lying between said knife means, and second carriage surfaces lying forwardly and rearwardly of the knife means, said second carriage surfaces and said knife means defining gaps therebetween in the forward and rearward movements of said knife means toward said forward and rearward plate means, respectively, locking plate means mounted outwardly at each of said forward and rearward plate means providing for cutting of said wood section at said gaps, and relief depressions between said knife means and said first carriage surface.

References Cited
UNITED STATES PATENTS

| | | | |
|---|---|---|---|
| 674,070 | 5/1901 | Stewart | 144—186 |
| 2,612,916 | 10/1952 | Bailey | 144—180 |
| 2,760,533 | 8/1956 | Bass | 144—162 |

FOREIGN PATENTS

| | | |
|---|---|---|
| 1,156,549 | 10/1963 | Germany. |

DONALD R. SCHRAN, *Primary Examiner.*